(12) United States Patent
Sugie

(10) Patent No.: US 11,108,938 B2
(45) Date of Patent: Aug. 31, 2021

(54) IMAGE PICKUP APPARATUS

(71) Applicant: CANON KABUSHIKI KAISHA, Tokyo (JP)

(72) Inventor: Takashi Sugie, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/751,369

(22) Filed: Jan. 24, 2020

(65) Prior Publication Data
US 2020/0244848 A1 Jul. 30, 2020

(30) Foreign Application Priority Data
Jan. 30, 2019 (JP) .............................. JP2019-013758

(51) Int. Cl.
*H04N 5/225* (2006.01)

(52) U.S. Cl.
CPC .......... *H04N 5/2254* (2013.01); *H04N 5/2253* (2013.01)

(58) Field of Classification Search
CPC ........................... H04N 5/2253; H04N 5/2254
See application file for complete search history.

(56) References Cited

U.S. PATENT DOCUMENTS

| 5,459,527 A * | 10/1995 | Lin | H04N 5/65 |
| | | | 313/112 |
| 5,834,761 A * | 11/1998 | Okada | H04N 9/04557 |
| | | | 250/208.1 |
| 6,628,339 B1 * | 9/2003 | Ferland | H04N 5/2253 |
| | | | 257/433 |
| 2006/0050417 A1 * | 3/2006 | Ooi | G02B 7/02 |
| | | | 359/819 |
| 2007/0091181 A1 * | 4/2007 | Serikawa | H04N 5/23248 |
| | | | 348/208.3 |
| 2008/0079812 A1 * | 4/2008 | Yamamoto | G03B 19/12 |
| | | | 348/207.99 |
| 2011/0129206 A1 * | 6/2011 | Muramatsu | G03B 5/00 |
| | | | 396/55 |
| 2012/0038784 A1 * | 2/2012 | Irisawa | H04N 5/23287 |
| | | | 348/208.7 |
| 2018/0027152 A1 * | 1/2018 | Sheridan | H04N 5/2254 |
| | | | 348/47 |
| 2018/0115693 A1 * | 4/2018 | Matsushima | H04N 5/2328 |
| 2019/0045096 A1 * | 2/2019 | Mullenary | H01L 27/14618 |
| 2019/0219897 A1 * | 7/2019 | Tiongson | H04N 5/2254 |

FOREIGN PATENT DOCUMENTS

| JP | 2017-169175 A | 9/2017 |
| JP | 6316000 B2 | 4/2018 |

* cited by examiner

*Primary Examiner* — Amy R Hsu
(74) *Attorney, Agent, or Firm* — Cowan, Liebowitz & Latman, P.C.

(57) ABSTRACT

An image pickup apparatus includes an image sensor, a substrate mounted with the image sensor, a first holding member configured to hold the image sensor, and having an opening configured to expose an imaging plane of the image sensor, the image sensor being fixed to the first holding member via an adhesive while the image sensor is housed in the opening of the first holding member, and a convex portion extending in a direction from the first holding member to the substrate.

9 Claims, 5 Drawing Sheets

SECTION A-A

IMAGE PICKUP APPARATUS

BACKGROUND OF THE INVENTION

Field of the Invention

The present invention relates to an image pickup apparatus having an imaging unit that fixes and holds an image sensor through an adhesive.

Description of the Related Art

There has conventionally been known an image pickup apparatus having an imaging unit that includes a combination of an image sensor and a sheet metal element holder. Japanese Patent No. 6316000 discloses an imaging unit that includes a substrate mounted with an image sensor and an element holder having an opening into which the image sensor is inserted. Japanese Patent No. 6316000 also discloses a receiving piece provided inside the opening in the element holder, and the image sensor and the element holder are fixed by bonding the front side of the image sensor received by the receiving piece.

Japanese Patent Application Laid-Open No. 2017-169175 discloses an imaging unit in which an opening of an element holder has a standing wall portion projecting to the back surface side so as to face the side surface of the image sensor, and an adhesive is provided between the side surface of the image sensor and the standing wall portion so as to fix them. The imaging unit disclosed in Japanese Patent Application Laid-Open No. 2017-169175 has no direct contact surface between the image sensor and the element holder and fixes them with the adhesive after determining a positional relationship between them through a jig. This configuration will generally be called "aerial adhesion" and widely used to make smaller the imaging unit.

The imaging unit disclosed in Japanese Patent No. 6316000 needs the contact surface with the receiving piece of the element holder outside the imaging plane of the image sensor, and thus the image sensor becomes larger. On the other hand, in the imaging unit disclosed in Japanese Patent Laid-Open No. 2017-169175, the element holder cannot receive the image sensor when a force in the optical axis direction is applied to the image sensor, and thus the adhesive may be peeled off due to a stress in the shear direction applied to the adhesive that connects the image sensor and the element holder to each other.

SUMMARY OF THE INVENTION

The present invention provides a compact image pickup apparatus which can suppress peel off of the adhesive even when a force is applied to an image sensor.

An image pickup apparatus according to one aspect of the present invention includes an image sensor, a substrate mounted with the image sensor, a first holding member configured to hold the image sensor, and having an opening configured to expose an imaging plane of the image sensor, the image sensor being fixed to the first holding member via an adhesive while the image sensor is housed in the opening of the first holding member, and a convex portion configured to extend in a direction from the first holding member to the substrate.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 4:
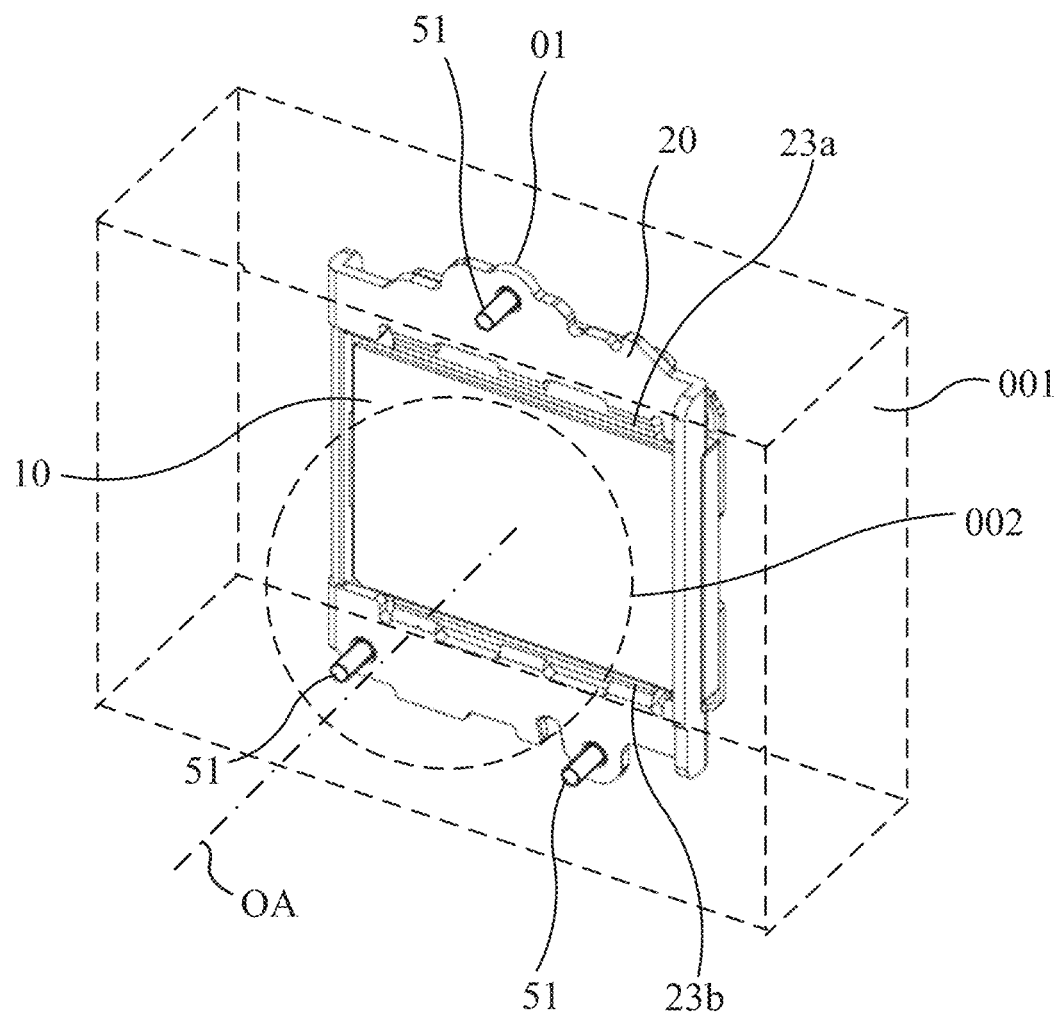
FIG. 4 is a perspective view of an image pickup apparatus and the imaging unit in this embodiment.

Referring now to FIG. 4, a description will be given of a configuration of an image pickup apparatus 001 and an imaging unit 01 according to this embodiment. FIG. 4 is a perspective view of the image pickup apparatus 001 and the imaging unit 01. The image pickup apparatus 001 photoelectrically converts light incident from a lens unit (imaging optical system) 002 by an image sensor 10 and records it as an electronic image in an internal memory. The lens unit 002 includes a zoom lens and a focus lens that can move in a direction (optical axis direction) along an optical axis OA. The image sensor 10 is fixed onto an element holder (first holding member) 20 made of a conductive metal sheet and constitutes the imaging unit 01. The element holder 20 is fixed in a housing of the image pickup apparatus 001 with a plurality of screws 51. Accordingly, the imaging unit 01 is fixed inside the housing of the image pickup apparatus 001.

In fixing the image sensor 10 onto the element holder 20, there are generally used a method of fixing an area outside the light receiving surface of the image sensor 10 to the element holder 20 with screws, and a method of fixing the outer shape of the image sensor 10 with an adhesive. On the other hand, this embodiment adheres the image sensor 10 and the element holder 20 to each other by adhesives 23a and 23b. In this adhesion configuration, an adhesion method after the relative position is calibrated with a jig without a direct contact surface between the element holder 20 and the image sensor 10 is called the aerial adhesion. The aerial adhesion is advantageous to the size and cost reductions of the entire imaging unit 01 because it is unnecessary to provide the image sensor 10 with a positioning shape relative to the element holder 20.

Figure 1A:
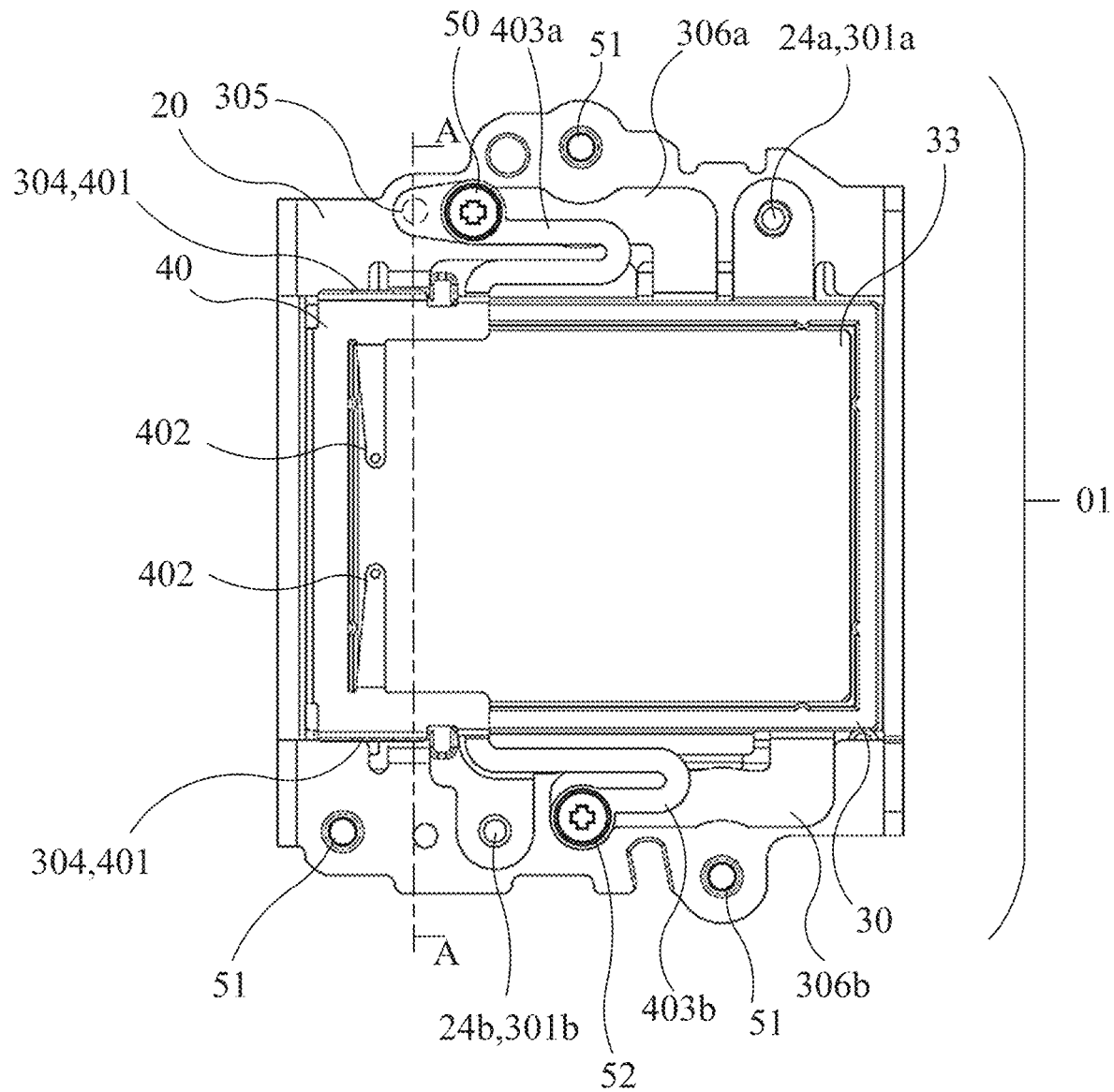
FIG. 1A is a front view of an imaging unit according to this embodiment.
Figure 1B:
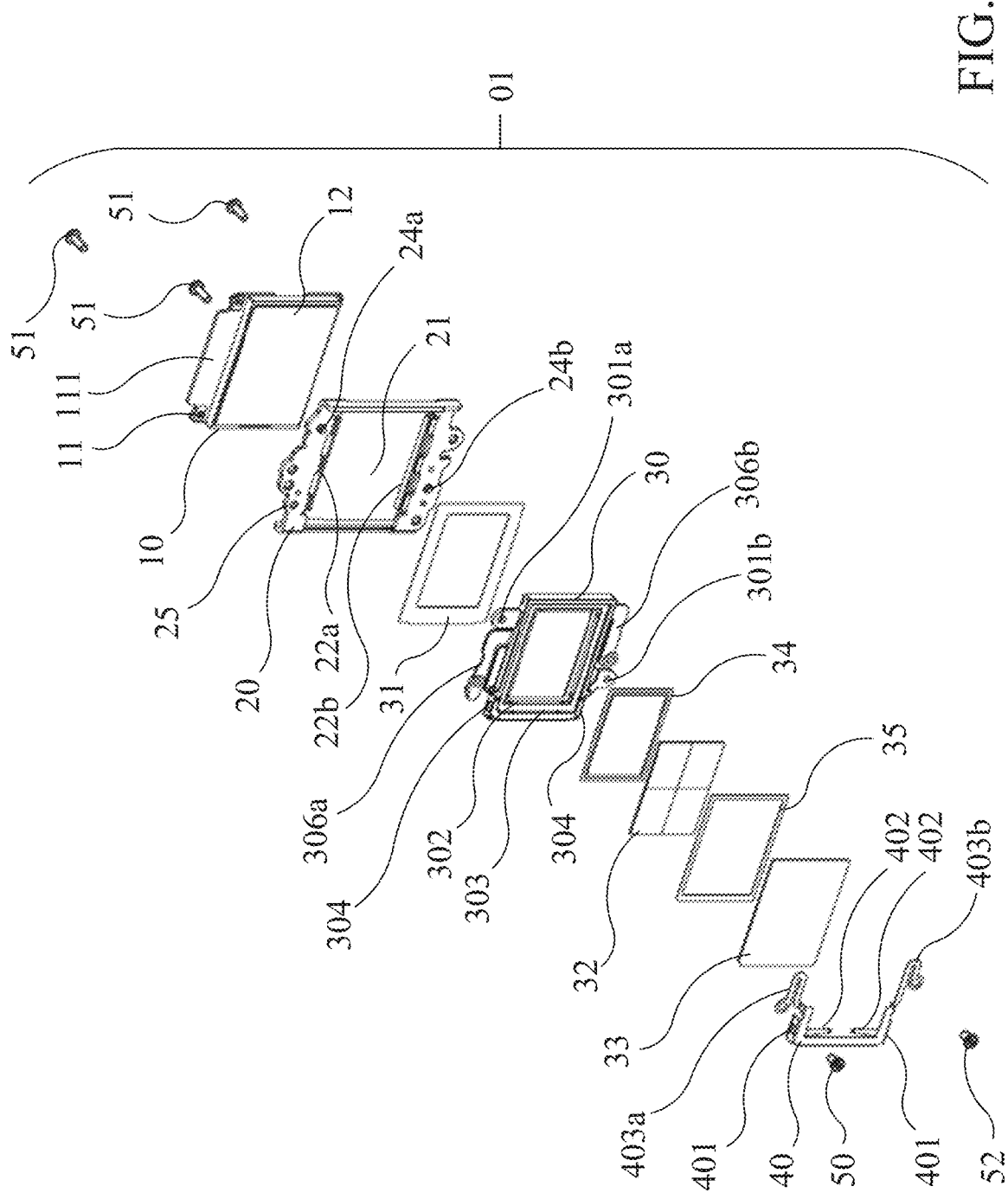
FIG. 1B is an exploded perspective view of the imaging unit according to this embodiment.

Referring now to FIGS. 1A and 1B, a description will be given of a configuration of the imaging unit 01 according to this embodiment. FIG. 1A is a front view of the imaging unit 01. FIG. 1B is an exploded perspective view of the imaging unit 01. In this embodiment, the imaging plane side will be set to the front surface. The imaging unit 01 is a unit configured to hold the image sensor 10 that performs the photoelectric conversion in the image pickup apparatus 001 and various optical elements inside the housing of the image pickup apparatus 001.

The image sensor 10 has a substantially rectangular shape and is mounted on a substrate 11. The front surface side (imaging plane side) of the image sensor 10 is covered with a protective glass 12. The element holder 20 is made of a sheet metal and has a shape in which the left side is bent to the back surface side and the right side is bent to the front surface side for rigidity enhancement and miniaturization, and has an opening 21 at the center with a substantially rectangular shape in which the image sensor 10 is to be inserted. In the assembly process of the imaging unit 01, the positions of two components or the image sensor 10 and the element holder 20 are calibrated in the vertical and horizontal height directions using a jig while the image sensor 10 is inserted into the opening 21 in the element holder 20 are bonded and fixed. At this time, the element holder 20, the image sensor 10, and the substrate 11 are aerially adhered to each other without a direct contact surface. The adhesive is filled between the standing bent portions 22a and 22b that are made by bending the upper side and the lower side of the opening 21 of the element holder 20 to the back surface side and the side surfaces of the image sensor 10 on the upper and lower sides. The adhesive will be described later with reference to FIG. 2.

The filter holding member (second holding member) 30 is disposed on the front surface of the image sensor 10 via the element holder 20. The filter holding member 30 is positioned in the vertical and horizontal directions with dowels 24a and 24b of the element holder 20 using hole portions 301a and 301b, and fixed onto the protective glass 12 with a first double-sided tape 31. A first optical filter housing 302 and a second optical filter housing 303 are provided on the front surface of the filter holding member 30. An infrared light cut filter 32 and a low-pass filter 33 are housed in the first optical filter housing 302 and the second optical filter housing 303, respectively, and a second double-sided tape 34 and a third double-sided tape 35 are fixed onto the filter holding member 30.

A conducting member 40 is made of a conductive sheet metal member, and is held and fixed since holes 401 formed in an upper side surface and a lower side surface are engaged with claw portions 304 formed on the filter holding member 30. A contact spring portion 402 is formed on the conductive member 40 and prevents the low-pass filter 33 from being charged when it contacts the surface of the low-pass filter 33.

Figure 2:
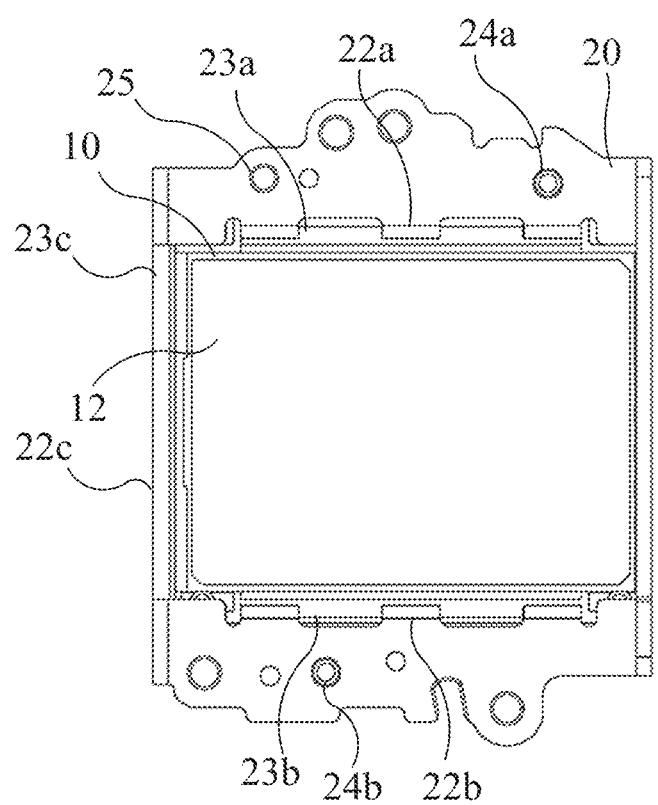
FIG. 2 illustrates an adhesion state between an image sensor and an element holder according to this embodiment.

Referring now to FIG. 2, a description will be given of the adhesion and fixing between the image sensor 10 and the element holder 20. FIG. 2 illustrates the image sensor 10 and the element holder 20 adhered and fixed to each other. The adhesives 23a and 23b are filled in spaces between the wall surfaces of the standing bent portions 22a and 22b of the element holder 20 opposite to the side surfaces on the upper side and the lower side of the image sensor 10, respectively. An adhesive 23c is also filled in a space between the side surface on the left side of the image sensor 10 and the standing bent portion 22c on the left side of the element holder 20 for adhesions.

Figure 3:
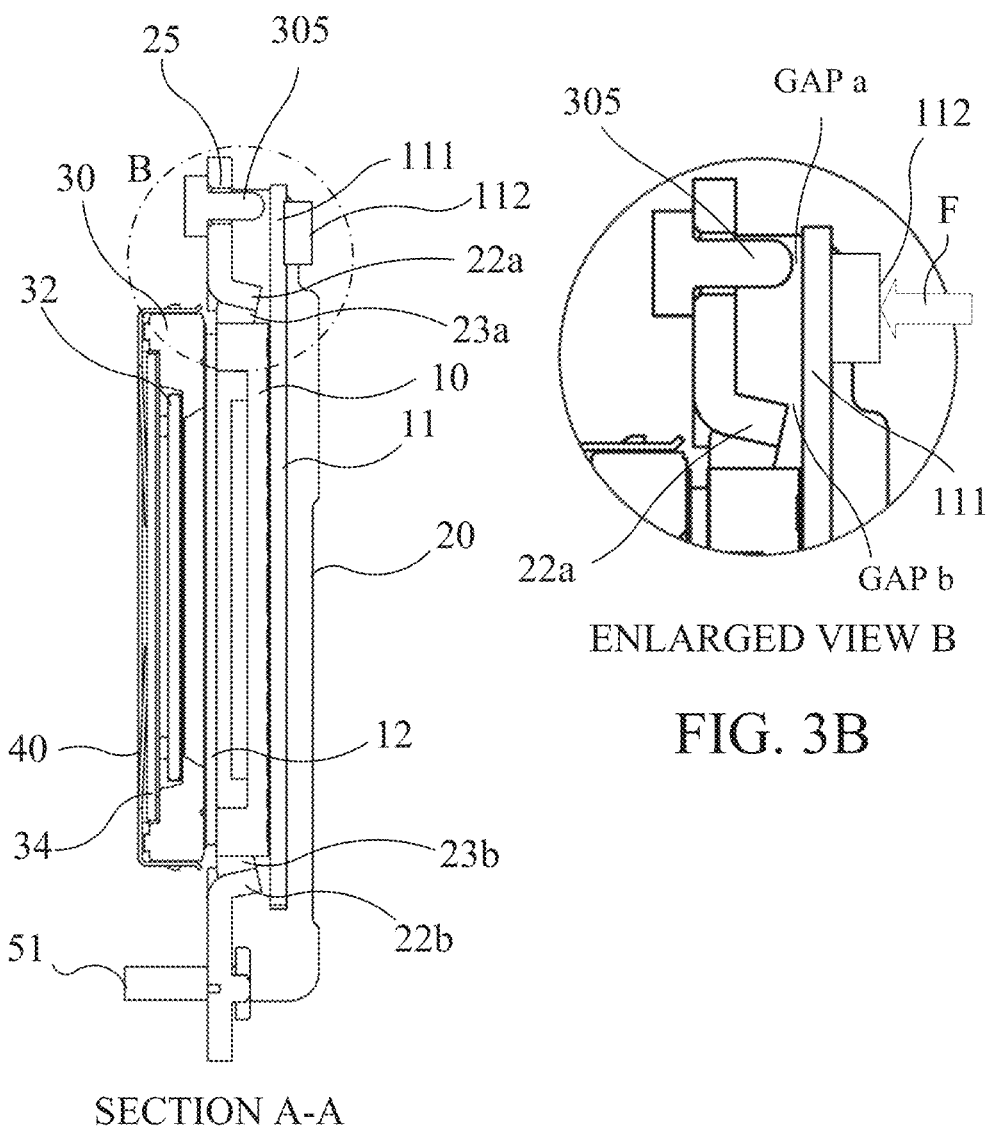
FIGS. 3A and 3B are sectional views of the imaging unit according to this embodiment.

Referring now to FIGS. 3A and 3B, a detailed description will be given of the configuration of the imaging unit 01. FIGS. 3A and 3B are sectional views of the imaging unit 01. FIG. 3A is a sectional view taken along a line A-A in FIG. 1A, and FIG. 3B is an enlarged view of an area B indicated by an alternate long and short dash line in FIG. 3A.

The substrate 11 has an area (image sensor non-mounting area) 111 which is larger than the outer shape of the image sensor 10 and has a surface opposite to the element holder 20 on the upper side of the image sensor 10. The element holder 20 has a through-hole 25 at a position opposite to an area 111 of the substrate 11. A pin portion 305 formed at part of the filter holding member 30 perforates through the through-hole 25 in the element holder 20 and extends so as to fill a space between the opposing surfaces of the element holder 20 and the substrate 11. A constant gap "a" is secured between the area 111 of the substrate 11 and the tip of the pin portion 305 so that the substrate 11 and the pin portion 305 do not interfere with each other in a normal state. In this embodiment, the gap "a" (a length (first distance) of the gap "a" in the horizontal direction (optical axis direction) in FIGS. 3A and 3B) is shorter than a gap "b" (a length (second distance) of the gap "b" in the horizontal direction (optical axis direction) in FIGS. 3A and 3B) between the standing bent portion 22a of the element holder 20 and the substrate 11 (area 111) (a<b).

In FIGS. 1A and 1B, the pin portion 305 and the main body of the filter holding member 30 are connected to each other by a flexible arm portion 306a extending from the upper side surface of the filter holding member 30. The pin portion 305 is fixed onto the element holder 20 by a screw (fixing member) 50 disposed at a connection position between the pin portion 305 and the arm portion 306a. An arm portion 403a extends from the upper side of the conductive member 40, and the tip of the arm portion 403a is fastened together with the arm portion 306a by the screw 50. The potential of the surface of the low-pass filter 33 becomes equivalent with that of the element holder 20 due to the conductive path through the conductive member 40 and the screw 50. The arm portion 306b extends from the lower side surface of the filter holding member 30, the arm portion 403b extends from the lower side of the conductive member 40, and the screw 52 is used to fix the tip of the element holder 20 similarly to the arm portions 306a and 403a. The arm portion 403b serves to assist the electrical connection between the conductive member 40 and the element holder 20.

The imaging unit 01 is attached to the image pickup apparatus 001 with screws 51. In addition, a connector 112 is mounted on the back surface (second surface) of the area (image sensor non-mounting area) 111 of the substrate 11. A connector of a flexible substrate (not shown) that electrically connects the imaging unit 01 and the image pickup apparatus 001 to each other is inserted into the connector 112 mounted on the substrate 11. At this time, a force F is applied to the substrate 11 and the image sensor 10 through the connector 112 in the front surface direction (left direction) as illustrated in FIG. 3B, and stresses in the shear direction are applied to the adhesives 23a, 23b, and 23c. At the same time, bending occurs in the front surface direction (left direction) in the area 111 of the substrate 11, and the substrate 11 and the pin portion 305 come into contact with each other and thus prevent the adhesives 23a, 23b, and 23c of the imaging unit 01 from breaking and peeling during the assembly work of the image pickup apparatus 001.

The arm portions 306a and 306b of the filter holding member 30 and the arm portions 403a and 403b of the conductive member 40 are flexible. Thus, even when the body of the filter holding member 30 and the fixing portion of each arm portion are displaced, the displacement is absorbed by each arm portion, and the image sensor 10 does not receive a large force from the filter holding member 30 via the first double-sided tape 31.

Thus, in this embodiment, the image pickup apparatus 001 includes the image sensor 10, the substrate 11 mounted with the image sensor, and the first holding member (element holder 20) configured to hold the image sensor. The first holding member has an opening 21 configured to expose an imaging plane of the image sensor. The image sensor is fixed to the first holding member via adhesives 23a, 23b, and 23c while the image sensor is housed in the opening of the first holding member. The image pickup apparatus includes a convex portion (pin portion 305) extending in a direction from the first holding member to the substrate.

The substrate may have an area 11 provided outside a mounting area of the image sensor and opposite to the first holding member, and the convex portion may extend toward the area 111 of the substrate. A gap "a" may be provided between the tip of the convex portion and the substrate. The image pickup apparatus may include an optical filter (infrared light cut filter 32, low-pass filter 33) and a second holding member (filter holding member 30) configured to hold the optical filter. The convex portion may be formed by part of the second holding member. A through-hole 25 is formed in the first holding member. The convex portion may be inserted into the through-hole in the first holding member from the second holding member and extend toward the substrate.

The image pickup apparatus may include an arm portion 306a that connects the convex portion and the second holding member to each other, and a fixing member (screw 50) disposed on the arm portion and configured to fix the convex portion and the first holding member. The arm portion may be flexible. The image pickup apparatus may include a conductive member 40 electrically connected to the optical filter (low-pass filter 33). The first holding member and the optical filter may be electrically connected to each other when the fixing member fixes the conductive member. The image pickup apparatus may include a connector 112 mounted on a second surface (back surface) opposite to the first surface (image sensor mounting surface) of the substrate mounted with the image sensor. The convex portion may be disposed opposite to the connector and extend toward the first surface of the substrate.

A first distance (gap a) in an optical axis direction between the tip of the convex portion and the substrate may be shorter than a second distance (gap b) in the optical axis direction between the first holding member and the substrate (a<b). The first holding member may have a bent portion (standing bent portions 22a, 22b, and 22c) provided on the side surface of the image sensor, and the adhesive may be filled in a space between the side surface of the image sensor and the bent portion of the first holding member. The first distance (gap a) in the optical axis direction between the tip of the convex portion and the substrate may be shorter than the second distance (gap b) in the optical axis direction between the tip of the bent portion and the substrate.

This embodiment can provide a compact image pickup apparatus that can suppress the peel off of the adhesive even when a force is applied to the image sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-013758, filed on Jan. 30, 2019, which is hereby incorporated by reference herein in its entirety.

What is claimed is:

1. An image pickup apparatus comprising:
an image sensor;
a substrate mounted with the image sensor;
a first holding member configured to hold the image sensor, and having an opening configured to expose an imaging plane of the image sensor, the image sensor being fixed to the first holding member via an adhesive while the image sensor is housed in the opening of the first holding member;
a convex portion configured to extend in a direction from the first holding member to the substrate;
an optical filter;
a second holding member configured to hold the optical filter, the convex portion being formed at part of the second holding member;
an arm portion configured to connect the convex portion and the second holding member to each other; and
a fixing member disposed on the arm portion and configured to fix the convex portion and the first holding member,
wherein the arm portion is flexible.

2. The image pickup apparatus according to claim 1, wherein the substrate has an area provided outside a mounting area of the image sensor and opposite to the first holding member, and the convex portion extends toward the area of the substrate.

3. The image pickup apparatus according to claim 1, wherein a gap is provided between a tip of the convex portion and the substrate.

4. The image pickup apparatus according to claim 1, wherein the first holding member has a through-hole, and
wherein the convex portion is inserted into the through-hole in the first holding member from the second holding member and extends toward the substrate.

5. The image pickup apparatus according to claim 1, further comprising a conductive member electrically connected to the optical filter,
wherein the first holding member and the optical filter are electrically connected to each other when the fixing member fixes the conductive member.

6. The image pickup apparatus according to claim 1, further comprising a connector mounted on a surface opposite to a first surface of the substrate mounted with the image sensor,
wherein the convex portion is disposed opposite to the connector and configured to extend toward the first surface of the substrate.

7. The image pickup apparatus according to claim 1, wherein a first distance in an optical axis direction between a tip of the convex portion and the substrate is shorter than a second distance in the optical axis direction between the first holding member and the substrate.

8. The image pickup apparatus according to claim 1, wherein the first holding member includes a bent portion provided on a side surface of the image sensor, and the adhesive is filled in a space between the side surface of the image sensor and the bent portion of the first holding member.

9. The image pickup apparatus according to claim 8, wherein a first distance in an optical axis direction between a tip of the convex portion and the substrate is shorter than a second distance in the optical axis direction between a tip of the bent portion and the substrate.

* * * * *